(12) United States Patent
Christine et al.

(10) Patent No.: US 6,516,376 B1
(45) Date of Patent: Feb. 4, 2003

(54) COMMAND AND CONTROL ARCHITECTURE FOR A VIDEO DECODER AND A HOST

(75) Inventors: Charles Christine, Hamilton, NJ (US); Renata Trafidlo, Munich (DE)

(73) Assignees: Sarnofff Corporation, Princeton, NJ (US); Motorola Corporation, Scottsdale, AZ (US)

( * ) Notice: Subject to any disclaimer, the term of this patent is extended or adjusted under 35 U.S.C. 154(b) by 0 days.

(21) Appl. No.: 09/449,897

(22) Filed: Nov. 30, 1999

Related U.S. Application Data

(60) Provisional application No. 60/114,835, filed on Jan. 6, 1999.

(51) Int. Cl.[7] .............................................. G06F 17/00
(52) U.S. Cl. ........................ 710/305; 725/109; 725/136
(58) Field of Search ........................ 710/1, 2, 313–315, 710/300, 105, 305; 725/91, 93, 136, 153, 131, 100, 139, 151, 109; 348/14.01, 553, 571, 725, 723; 375/316; 709/200, 203; 381/22; 345/418; 704/501; 370/464

(56) References Cited

U.S. PATENT DOCUMENTS

| | | | | |
|---|---|---|---|---|
| 5,818,530 | A | * | 10/1998 | Canfield et al. |
| 5,838,597 | A | * | 11/1998 | Pau et al. |
| 6,108,584 | A | * | 8/2000 | Edwards |
| 6,134,613 | A | * | 10/2000 | Stephenson et al. |
| 6,305,021 | B1 | * | 10/2001 | Kim |
| 6,374,404 | B1 | * | 4/2002 | Brotz et al. |

* cited by examiner

*Primary Examiner*—Gopal C. Ray
(74) *Attorney, Agent, or Firm*—W. J. Burke

(57) ABSTRACT

A method and apparatus for using an interface and concomitant communication protocol to allow a host to control and communicate with a video decoder. More specifically, an interface structure having a status interface line and at least two data interface lines are employed between a video decoder and a host. The interface allows a communication protocol to effect communication and control of timing information, data transmission, and input and output selection.

21 Claims, 4 Drawing Sheets

COMMAND AND CONTROL ARCHITECTURE FOR A VIDEO DECODER AND A HOST

This application claims the benefit of U.S. Provisional Application No. 60/114,835 filed on Jan. 6, 1999, which is herein incorporated by reference.

The invention relates to an apparatus and concomitant method for controlling and monitoring a decoder system. More specifically, the present invention incorporates an interface structure having a status interface line and a plurality of data interface lines and concomitant communication protocol to allow a host to control and communicate with a video decoder.

BACKGROUND OF THE DISCLOSURE

The proliferation of digital video/audio information presents a challenge for systems that are tasked with receiving and decoding such complex information. Namely, digital information, e.g., a movie or a "live" broadcast from a digital studio or from a storage device, is often converted into compressed bitstreams before being transmitted or stored. The compressed bitstreams contain various data elements that include video, audio, timing, program specific information and control data which are packaged into various "packets". A packet is a group of binary digits that include various data elements which are switched and transmitted as a composite whole.

In turn, a decoding system must receive and decode the packets properly to extract the digital video/audio information. The data elements and other information are arranged in accordance with various specific formats, e.g., ISO/IEC international Standards 11172-* (Moving Picture Experts Group (MPEG-1)), 13818-* (MPEG-2), American Television Standards Committee (ATSC) standards and Digital Video Broadcasting (DVB) specification prETS 300–468 are just several examples.

To illustrate, in general, MPEG defines a packet as consisting of a header followed by a number of contiguous bytes from an "elementary data stream". An elementary stream is simply a generic term for one of the coded video, coded audio or other coded bitstreams. More specifically, a MPEG-2 "transport stream" packet comprises a header, which may be four (4) or more bytes long with a payload having a maximum length of 184 bytes. Transport stream packets are part of one or more programs which are assembled into a transport stream. The transport stream is then transmitted over a channel with a particular transfer rate.

As the transmission bandwidth increases in response to greater demand, it becomes increasingly more difficult to decode such an enormous amount of transmitted information, especially in real time by a single decoder. As such, the decoding function has been allocated such that two or more decoders are now employed to perform the decoding function, e.g., a video decoder to handle image information and an audio decoder to handle audio information. However, since the various components of the digital video/audio information, e.g., a video sequence and its associated audio frames, are closely related, the decoders must carefully coordinate their decoding functions to properly address numerous decoding and presentation issues, e.g., timing issues, lost information, servicing user selections, and the like. In fact, as the complexity of the digital video/audio information increases, the decoding system may employ a separate controller or a host to monitor the functions performed by the decoders, e.g., to arbitrate conflicts between the decoders.

Therefore, a need exists in the art for a method and apparatus for effecting communication between components within a decoding system. Specifically, a need exists for an interface and concomitant communication protocol to allow a host to control and communicate with a video decoder.

SUMMARY OF THE INVENTION

The present invention is a method and apparatus for using an interface and concomitant communication protocol to allow a host to control and communicate with a video decoder. More specifically, the present interface structure allows multiple data streams to be passed between the host and the video decoder by using control data or meta-data on the status interface line to inform the host or video decoder as to which data interface lines are currently carrying relevant data that the host or video decoder should service. The novel interface structure allows a communication protocol to effect communication, control of timing information, data transmission, and input and output selection without having to add extra control data onto the data streams or to adhere to a strict time schedule as to which data interface line is actually carrying relevant data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
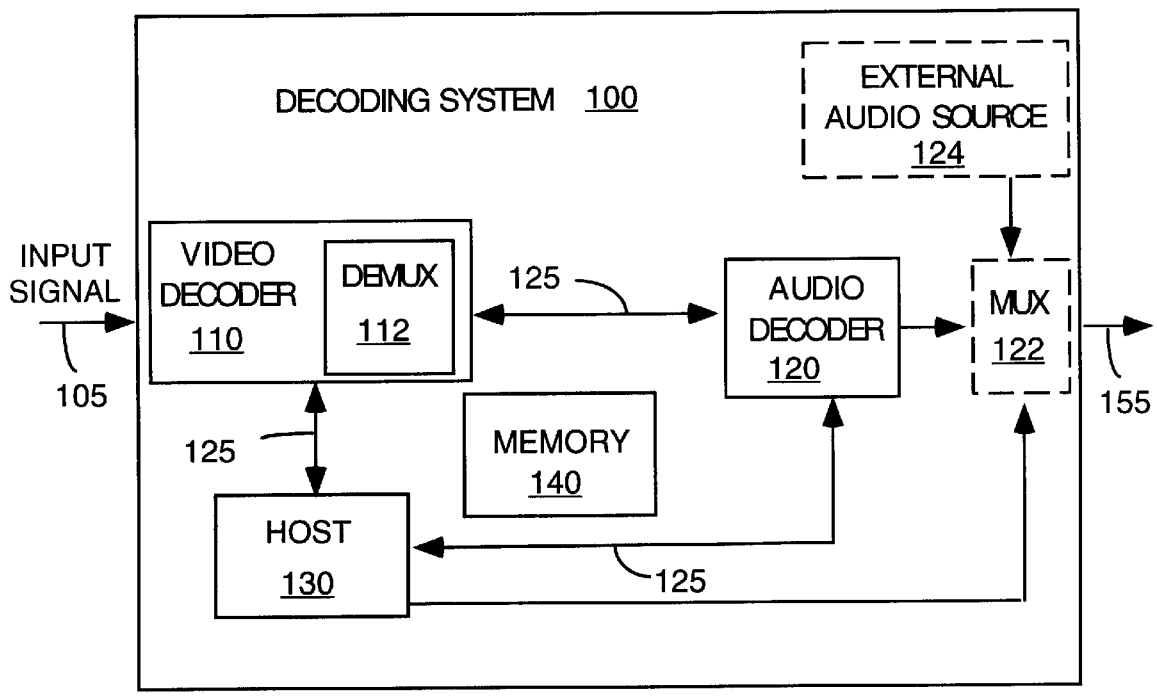
FIG. 1 depicts a block diagram of a decoding system of the present invention.

FIG. 1 illustrates a block diagram of a decoding system 100 of the present invention. The decoding system 100 of the present invention can be implemented within another larger system, e.g., a receiver or a set top box.

The decoding system 100 comprises a video decoder 110, an audio decoder 120, a controller or host 130 and a memory 140. In operation, an input signal is received by the decoding system 110 on path 105. The input signal can be a broadcasted input signal, e.g., a program broadcasted from a transmitter, or an input signal retrieved from a storage device, e.g., from a video disk or tape. The decoding system 100 decodes the input signal and produces one or more decoded signals, e.g., a decoded video signal and a decoded audio signal on path 155.

Furthermore, for the purpose of describing the present invention, it is presumed that the input signal includes both audio and video components that are in the format of "transport packets". However, if the input signal is in another format, e.g., having undergone additional encoding (e.g., channel encoding), then it is presumed that a preprocessing section (not shown) has performed the necessary complementary channel decoding on the input signal. Alternatively, it is also possible to incorporate such channel decoding capabilities into the video decoder 110.

The present invention is described below with reference to an input signal that is carrying an MPEG or ATSC compliant bitstream. As such, a brief description is provided here concerning the relationship between the data and timing information that form a significant portion of the bitstream. However, although the present invention is described below with respect to MPEG or ATSC compliant bitstreams, it should be understood that the present invention can be adapted to bitstreams in accordance with other formats.

More specifically, ATSC compliant Program Elementary Streams (PESs) carry system time clock information along with payload information. For ATSC audio data, the payload is generally AC/3 data or AC/3 related meta-data. The system time clock information passed in the PES stream consists of a Decode Time Stamp (DTS) (optional) and a Presentation Time Stamp (PTS) (optional). In the absence of a DTS, the decoder may use the PTS to determine the DTS. In the absence of a PTS, the PTS of a previous PES packet may be used with the knowledge of the length of the data contained within the PES packet to reconstruct the PTS for the packet.

To use the PTS/DTS information contained within a given PES stream, the ATSC compliant decoder must have access to the System Time Clock (STC) for the system. In addition, any PCR discontinuities, which are passed in the transport stream of the ATSC compliant stream, must be communicated throughout the system. Since this information is passed in the ATSC transport stream and not within the PES streams, this data must be handled separately from the PES data.

FIG. 1 illustrates a memory 140 that can be employed to store and retrieve data, command, messages, and/or software instructions or programs as discussed below. Although a single memory 140 is illustrated, it should be understood that one or more memories can be employed within the decoding system, e.g., a dedicated memory can be implemented for each of the decoders and host.

In the preferred embodiment, the host 130 is implemented using a processor (e.g., PPC821 from Motorola of Schaumburg, Ill.), which serves as a high level controller for initializing, controlling, synchronizing and/or providing various user level functionalities for a decoding system which may include the audio decoder 120 and the video decoder 110. However, it should be understood that other processors can be employed as the host of the present invention.

The audio decoder 120 is an audio decoder that is capable of decoding audio information that is encoded in one or more formats, e.g., MPEG and ATSC. For example, the audio decoder 120 is an ATSC compliant audio decoder that is capable of decoding Program Elementary Streams (PES) level Audio Compression (AC/3) data into a PCM audio output. In the preferred embodiment, the audio decoder is implemented using a digital signal processor, e.g., the 56009 DSP chip or the 56362 DSP chip from Motorola, for performing audio decoding.

The video decoder 110 is a video decoder that is capable of decoding video information that is encoded in one or more formats, e.g., MPEG and ATSC. For example, video decoder 110 can be an MPEG or ATSC compliant video decoder. In the preferred embodiment, the video decoder 110 is implemented as a custom Application Specific Integrated Circuits (ASIC) that is capable of decoding MPEG 2 video data and routing transport payloads based upon Packet Identifliers (PIDs).

In the preferred embodiment, the video decoder 110 incorporates a demultiplexor (DEMUX) 112 for de-multiplexing at least two PES streams to the audio decoder 120 from the transport stream (input signal) that is received on path 105. Although the present invention discloses an interface 125 that is capable of handling at least two PES streams, it should be understood that the present invention can be adapted to any number of PES streams in the input signal to be passed between the video decoder and audio decoder.

Optionally, the decoding system may incorporate a multiplexor (MUX) 122 that accepts input from the audio decoder 120 and an external audio source 124, e.g., a storage device or from a communication channel. The purpose of the multiplexor is to optionally allow other audio sources to be selectively presented, e.g., a sampled version of an NTSC audio signal. The operation of the multiplexor is controlled by the host 130.

The host 130 is coupled to the audio decoder 120 via a bi-directional serial interface 125. This interface is dedicated to the transmission and reception of command, status messages and audio data between the host and the audio decoder. In the preferred embodiment, this interface can either emulate as a Phillips Inter-Integrated-Circuit Control ($I^2C$) or a Motorola Serial Peripheral Interface (SPI). Since the present invention employs a Motorola host processor as a controller, the SPI interface is implemented in the present communications protocol.

In turn, the host 130 is coupled to the video decoder 110 via a bi-directional serial interface 125. This interface is dedicated to the transmission and reception of command, status messages and video data between the host and the video decoder.

In turn, the video decoder 110 is coupled to the audio decoder 120 via a serial interface 125 and is described below with reference to FIG. 5. This interface is dedicated to the transmission and reception of command, status messages and audio data, e.g., PES streams, between the video decoder and the audio decoder.

In the preferred embodiment, data interface portion of the overall serial interface structure 125 is a Motorola serial interface. Although a Motorola data interface is employed in the present invention, it should be understood that other serial data interface can be adapted into the serial interface structure 125 of the present invention to provide the various functionalities that are described below.

Figure 2:
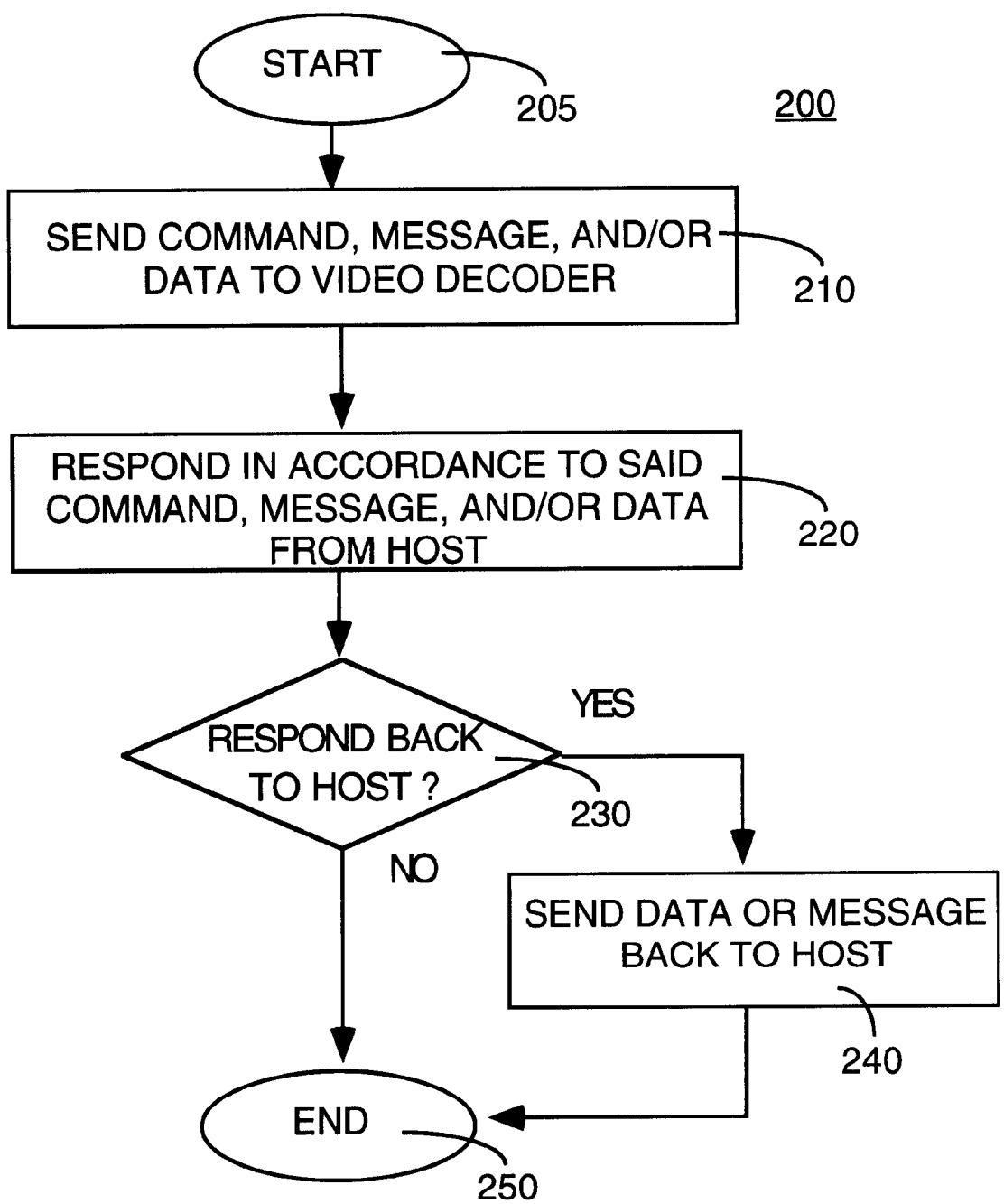
FIG. 2 depicts a flow chart for a method of using an interface to allow a host to communicate directly with a video decoder.

FIG. 2 illustrates a flow chart for a method 200 for using interface 125 to allow the host to communicate directly with the video decoder. Such communication will allow the decoding system 100 to effect various novel functionalities by communicating commands, messages and/or data between the host and the video decoder.

Method 200 starts in step 205 and proceeds to step 210, where the host sends commands, messages and/or data to the video decoder. These commands, messages and data include, but are not limited to, timing verification and synchronization, selective control of video output, status request, data transmission, and error detection. These commands, messages and/or data are described below.

In step 220, the video decoder 110 will respond in accordance with the commands, messages and/or data received from the host. Namely, the video decoder may process the received data, execute a desired action, e.g., changing a time base value, and/or return a status message in accordance with the received commands and messages from the host.

In step 230, method 200 queries whether a response or reply from the video decoder is necessary in light of the received commands, messages and/or data. Depending on the specific nature of the received command and/or message, a response from the video decoder may be expected by the host. As such, if the query is negatively answered, then method 200 ends in step 250. If the query is positively answered, then method proceeds to step 240, where a response, e.g., data or message, is returned to the host and then method 200 ends in step 250.

Figure 3:
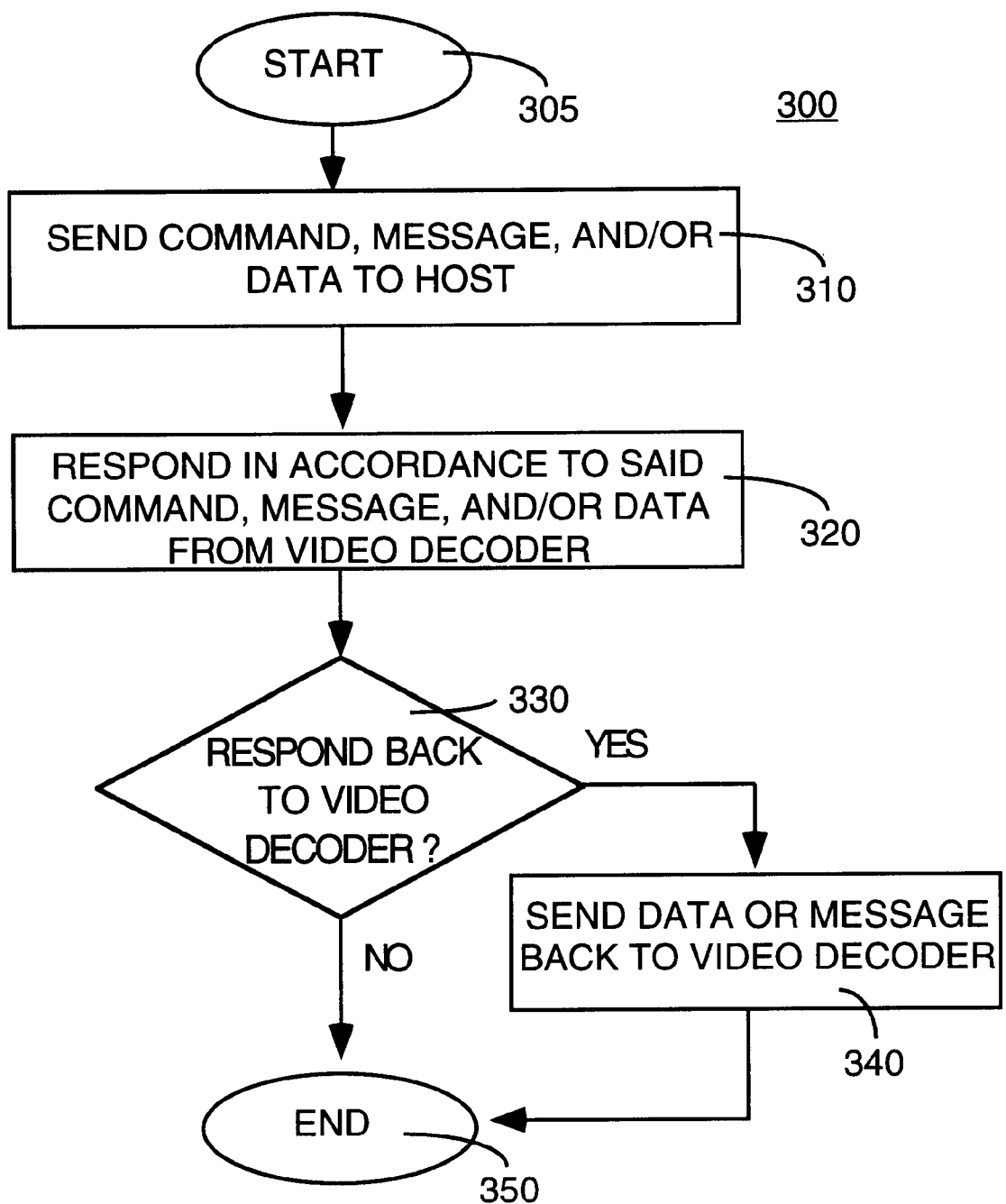
FIG. 3 depicts a flow chart for a method of using an interface to allow a video decoder to communicate directly with a host.

FIG. 3 illustrates a complementary flow chart for a method 300 for using interface 125 to allow the video decoder to communicate directly with the host. Such communication will allow the decoding system 100 to effect various novel functionalities by communicating commands, messages and/or data between the video decoder and the host.

Method 300 starts in step 305 and proceeds to step 310, where the video decoder sends commands, messages and/or data to the host. These commands, messages and data include, but are not limited to, timing verification and synchronization, selective control of audio output, status request, data transmission, and error detection. These commands, messages and/or data are described below.

In step 320, the host 130 will respond in accordance with the commands, messages and/or data received from the video decoder. Namely, the host may process the received data, execute a desired action, e.g., changing a time base value, and/or return a status message in accordance with the received commands and messages from the video decoder.

In step 330, method 300 queries whether a response or reply from the host is necessary in light of the received commands, messages and/or data. Depending on the specific nature of the received command and/or message, a response from the host may be expected by the video decoder. As such, if the query is negatively answered, then method 300 ends in step 350. If the query is positively answered, then method proceeds to step 340, where a response, e.g., data or message, is returned to the video decoder and then method 300 ends in step 350.

The above architecture of the decoding system 100 can be exploited to provide a plurality of functionalities by communicating various commands, messages and/or data between the host and video decoder as disclosed below. Additionally, the use of a host to monitor and control an audio decoder and the implementation of a command and control architecture between a video decoder and an audio decoder, respectively, are disclosed in two accompanying patent applications filed simultaneously herewith on Nov. 30, 1999 with the title "Command And Control Architecture For An Audio Decoder And A Host"; Ser. No. 09/449,894, and "Command And Control Architecture For A Video Decoder And An Audio Decoder", Ser. No. 09/449,893), which are hereby incorporated by reference.

Figure 5:
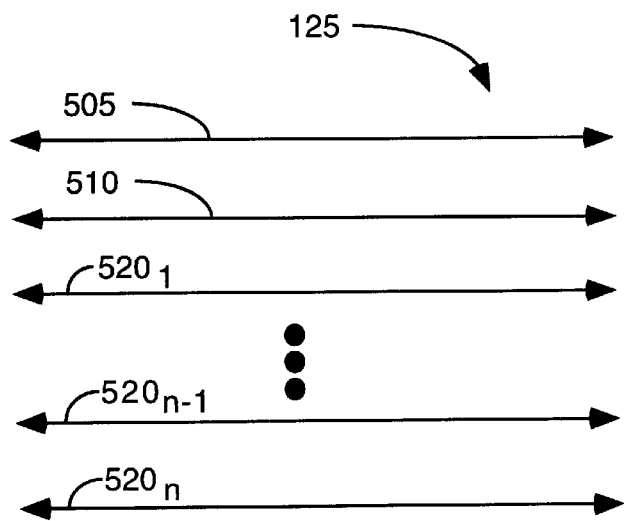
FIG. 5 illustrates an interface architecture between a video decoder and a host.

FIG. 5 illustrates the interface architecture 125 between the host 130 and video decoder 110. The interface architecture 125 comprises a synchronization line 505, a status interface line 510 and a plurality of data interface lines $520_{1-n}$. In one embodiment, the synchronization line 505, the status interface line 510 and the plurality of data interface lines $520_{1-n}$ are serial interface lines. The data interface lines $520_{1-n}$ are employed to allow passage of data between the host 130 and video decoder 110, whereas the status interface line 510 is employed to allow passage of commands and/or messages between the host 130 and video decoder 110. The synchronization line 505 is employed to provide a synchronization signal to effect data transfer. It should be understood that the synchronization line 505 may actually employ one or more synchronization lines depending on the implementation of the present interface structure, i.e., one or more data interface lines may share one or more synchronization lines.

One important aspect of the present invention is the ability to employ standard data interface between the host and video decoder while providing additional functionalities. Namely, the present invention allows the use of a conventional video decoder and data interfaces while providing new functionalities as described below.

Timing Command and Messages

First, the video decoder 110 is able to issue a command or message to inform the host 130 when a PCR discontinuity is received in the bitstream on path 105. Namely, the host 130 must be informed of the timing inconsistency, so that the host can address the problem accordingly, e.g., informing the audio decoder of the PCR discontinuity and the new PCR value to allow the audio decoder to address the problem by itself, or the host may optionally inform the audio decoder and then direct the audio decoder to perform an action, e.g., mute the audio output.

Second, the video decoder is able to issue a command or message to inform the host when a new PCR has been received in the bitstream. Namely, the new PCR allows the host to perform a number of monitoring functions, e.g., verify for PCR discontinuity, confirming channel changes due to changes in PCR values, and the like.

Third, the host is able to issue a command or message to read the video decoder's last encountered PCR value. Namely, this allows the host to track and monitor the timing of the video decoder.

Audio Data Control and Status Command and Messages

First, the host is able to issue a command or message to tell the video decoder which PID's (e.g., for two types) to place on the two serial PES interfaces between the video decoder 110 and the audio decoder 120. Namely, the host is capable of selectively directing the video decoder to place one or more audio streams onto one or more PES data interfaces between the video decoder and the audio decoder. Specifically, in MPEG, a PID is a unique 13 bit field, indicating the type of data that is stored in the packet payload. Thus, the PID values allow the host to determine which data interface in the interface structure 125 to use to channel the audio data to the audio decoder.

Second, the host shall be able to issue a command or message to determine which audio PIDs are currently mapped to a given PES output from the de-multiplexor of the video decoder. Namely, the host is able to read the setting on the de-multiplexor, i.e., requesting for status as to what audio data and what channel is currently being used to pass data to the audio decoder by the video decoder.

Third, the host is able to issue a command or message to selectively specify to the video decoder a group of PIDs that are of special interest. Namely, the host can inform the video decoder that certain PIDs among many others, are being monitored for the purpose of implementing other functionalities. For example, the host may implement special effects such as sound effect for a particular program, e.g., adding or deleting audio data to and from a program, replacing audio data of a program with other audio data (e.g., a program that is translated into different languages), and the like.

Fourth, the video decoder 110 is able to issue a command or message to inform the host 130 that a "PID of interest" has been encountered. In turn, the video decoder will then disable all subsequent announcements when it receives the same PID again, since audio data will likely arrive at a large rate and it is not necessary to interrupt the host for such announcement. In fact, if the above assumption is not correct, e.g., audio data is not being received by the audio decoder at a sufficient rate, then the audio decoder 120 has the capability to inform the host that it is being "starved".

Fifth, the host is able to issue a command or message to inform the video decoder to re-enable PID announcements if they were previously disabled. Namely, if the host deduces that a problem may exist as to the delivery of audio data associated with a particular PID, the host will notify the video decoder to again notify the host that the PID of interest has again arrived. This information allows the host to determine or measure the rate at which the audio data for a particular PID is arriving on path 105. This information will allow the host to address problem such as a starved audio decoder.

It should be noted that by using different data interface lines to pass various data between the host and video decoder, it is possible to correlate the various timing information and monitoring messaging functions on a particular data interface line to a particular data stream. For example, timing data passed on data interface line 1 can be associated with a first video PES, and timing data passed on data interface line 2 can be associated with a second video PES, and so on.

Additionally, for the purpose of claim interpretation, the data passed on the data interface lines may comprise video data, commands and/or messages. In turn, control data or meta-data on the status interface line informs the host or video decoder as to which data interface lines are currently carrying relevant data that the host or video decoder should service.

Figure 4:
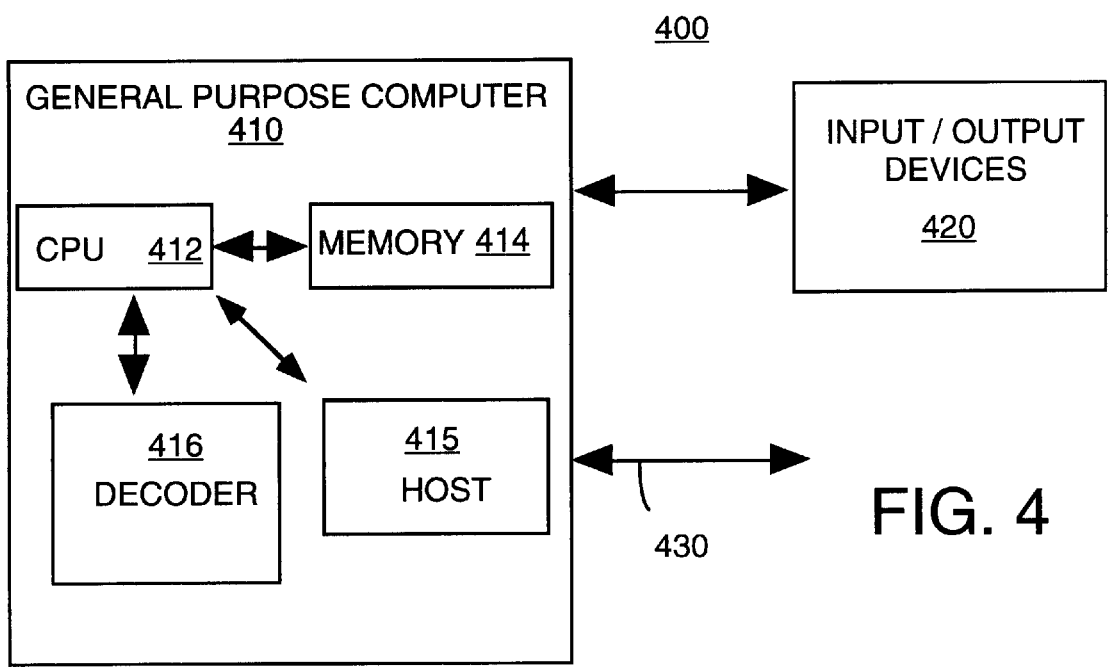
FIG. 4 illustrates a block diagram of another embodiment of the decoding system of the present invention.

FIG. 4 illustrates a decoding system 400 of the present invention. The decoding system comprises a general purpose computer 410 and various input/output devices 420. The general purpose computer comprises a central processing unit (CPU) 412, a memory 414, a host 415 and a decoder 416 for receiving and decoding a sequence of images and associated audio information.

In one embodiment, the decoder 416 is simply the video decoder 110 and/or audio decoder 120 and the host 415 is simply the host 130 as discussed above. The decoder(s) 416 and host 415 can be physical devices which are coupled to the CPU 412 through communication channels or interfaces. Alternatively, the decoder 416 and the host 415 can be represented by a software application (or a combination of software and hardware, e.g., application specific integrated circuits (ASIC)) which is loaded from a storage device and resides in the memory 412 of the computer. As such, the video decoder 110, audio decoder 120 and the host 130 of the present invention can be stored on a computer readable medium, e.g., a memory or storage device.

The computer 410 can be coupled to a plurality of input and output devices 420, such as a keyboard, a mouse, a camera, a camcorder, a video monitor, a loud speaker, stereo equipment, any number of imaging devices, audio devices or storage devices, including but not limited to, a tape drive, a floppy drive, a hard disk drive or a compact disk drive. The input devices serve to provide user inputs to the computer for producing the decoded video and audio bitstreams and/or to provide the sequence of video images and associated audio information from a storage device or an imaging device. Finally, a communication channel 430 is shown where the encoded signal is received from an encoding system (not shown).

Although various embodiments which incorporate the teachings of the present invention have been shown and described in detail herein, those skilled in the art can readily devise many other varied embodiments that still incorporate these teachings.

What is claimed is:

1. A method of communication between a video decoder and a host, said method comprising the steps of:
    (a) sending data from the video decoder to the host via at least one serial data interface line;
    (b) sending control data from the video decoder to the host via a status interface line; and
    (c) processing said data on said at least one serial data interface line in accordance with said control data by the host.

2. The method of claim 1, wherein said sending step (a) sends data having timing information.

3. The method of claim 2, wherein said sending step (a) sends data having timing information relating to a program clock reference (PCR) discontinuity.

4. The method of claim 2, wherein said sending step (a) sends data having timing information relating to a new program clock reference (PCR) value.

5. The method of claim 1, wherein said sending step (a) sends data having data information relating to a reception of a packet of interest.

6. A method of communication between a video decoder and a host, said method comprising the steps of:
    (a) sending data from the host to the video decoder via at least one serial data interface line;
    (b) sending control data from the host to the video decoder via a status interface line; and
    (c) processing said data on said at least one serial data interface line in accordance with said control data by the video decoder.

7. The method of claim 6, wherein said sending step (a) sends data having timing information.

8. The method of claim 7, wherein said sending step (a) sends data having timing information relating to a last encountered program clock reference (PCR) by the video decoder.

9. The method of claim 6, wherein said sending step (a) sends data having data information relating to a selection of audio data to be passed to an audio decoder by the video decoder.

10. The method of claim 6, wherein said sending step (a) sends data having data information relating to a status as to audio data that is currently being passed to an audio decoder by the video decoder.

11. The method of claim 6, wherein said sending step (a) sends data having data information relating to a reception of a packet of interest.

12. A computer-readable medium having stored thereon a plurality of instructions, the plurality of instructions including instructions which, when executed by a processor, cause the processor to perform the steps comprising of:
    (a) sending data from the video decoder to the host via at least one serial data interface line;
    (b) sending control data from the video decoder to the host via a status interface line; and
    (c) processing said data on said at least one serial data interface line in accordance with said control data by the host.

13. The computer-readable medium of claim 12, wherein said sending step (a) sends data having timing information.

14. The computer-readable medium of claim 12, wherein said sending step (a) sends data having data information relating to a reception of a packet of interest.

15. A computer-readable medium having stored thereon a plurality of instructions, the plurality of instructions including instructions which, when executed by a processor, cause the processor to perform the steps comprising of:

(a) sending data from the host to the video decoder via at least one serial data interface line, (b) sending control data from the host to the video decoder via a status interface line; and (c) processing said data on said at least one serial data interface line in accordance with said control data by the video decoder.

16. The computer-readable medium of claim 15, wherein said sending step (a) sends data having timing information.

17. The computer-readable medium of claim 15, wherein said sending step (a) sends data having data information relating to a selection of audio data to be passed to an audio decoder by the video decoder.

18. A decoding system comprising:

a video decoder, a host; and an interface structure disposed between said video decoder and said host, said interface structure having a status interface line for passage of control data and a plurality of serial data interface lines for passage of data.

19. A method of communication between a video decoder and a host, said method comprising the steps of:

(a) sending data, having timing information relating to a program clock reference (PCR) discontinuity, from the video decoder to the host via at least one data interface line;

(b) sending control data from the video decoder to the host via a status interface line; and (c) processing said data on said at least one data interface line in accordance with said control data by the host.

20. A method of communication between a video decoder and a host, said method comprising the steps of:

(a) sending data, having timing information relating to a new program clock reference (PCR) value, from the video decoder to the host via at least one data interface line;

(b) sending control data from the video decoder to the host via a status interface line; and (c) processing said data on said at least one data interface line in accordance with said control data by the host.

21. A method of communication between a video decoder and a host, said method comprising the steps of:

(a) sending data, having timing information relating to a last encountered program clock reference (PCR) by the video decoder, from the host to the video decoder via at least one data interface line;

(b) sending control data from the host to the video decoder via a status interface line; and (c) processing said data on said at least one data interface line in accordance with said control data by the video decoder.

* * * * *